Oct. 19, 1954 H. F. SCHMIDT 2,691,869
UNITARY GATED IRRIGATION SPILE
Filed May 15, 1950
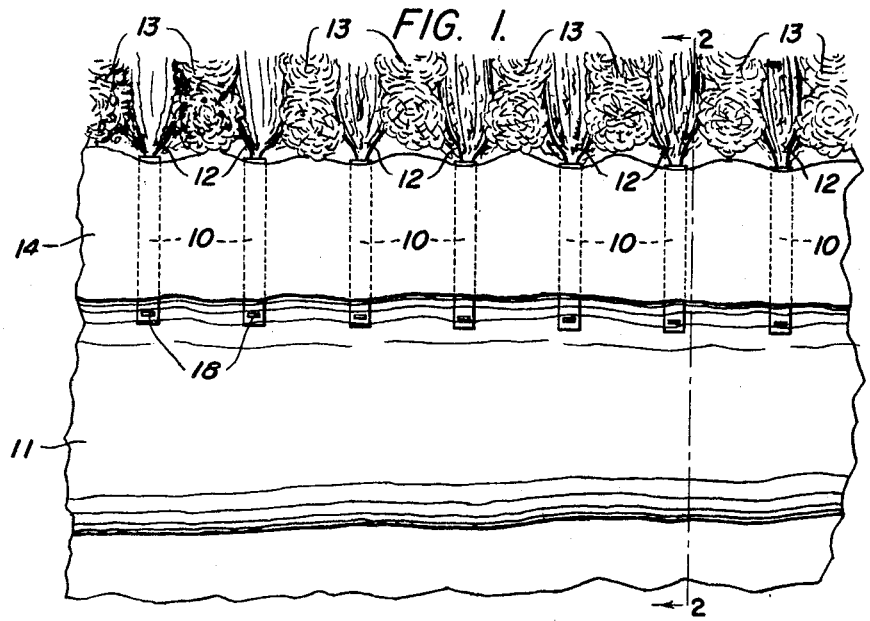
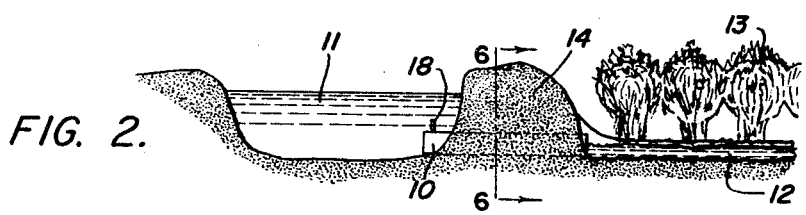
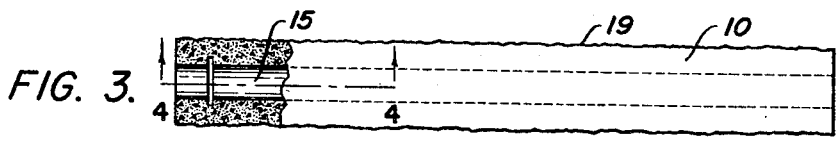
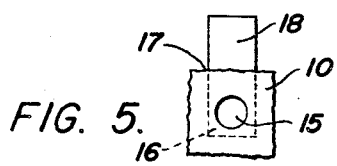
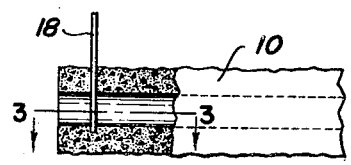
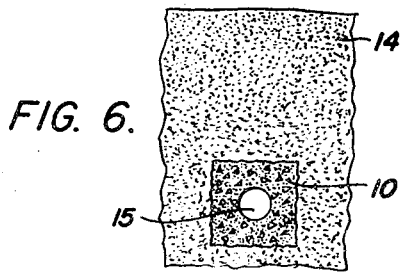
Inventor:
HENRY F. SCHMIDT,
Attorneys.

Patented Oct. 19, 1954

2,691,869

UNITED STATES PATENT OFFICE 2,691,869

UNITARY GATED IRRIGATION SPILE

Henry F. Schmidt, West Jordan, Utah

Application May 15, 1950, Serial No. 161,911

4 Claims. (Cl. 61—12)

This invention relates to irrigation spiles, and has for a principal object to provide a gated, unitary structure molded from a suitable material, such as concrete, which promotes economy, convenience, and efficiency in the distribution of irrigation water.

Farming carried on in arid regions requires that water be artificially supplied to growing plants. This has led to the development of the art of irrigation. As a rule, irrigation water is distributed to farms through canals and main ditches. From a main ditch the water is diverted to the fields or gardens through branch ditches, which extend across elevated portions of the areas to be watered, and feed into laterals running directly to the growing plants. Usually such laterals are provided by the furrows between crop rows.

A primitive method of diverting water from one ditch into another, especially from branch ditches into laterals, consists in cutting an opening in the bank of the one ditch and in using stones, sod, or other materials to partially dam the opening in an attempt to regulate the amount of water that flows from the one ditch into the other. A major objection to this primitive method is that, as the water flows, it is likely to wash away parts of the temporary dam provided to regulate or control the flow from the one ditch into the other.

The spile of the invention is intended to replace such primitive and temporary dams, and to afford positive and accurate control of flow by a structure which may be left in place permanently.

A feature of the invention resides in the provision of a spile that comes from a mold ready for putting into service, the spile being gated for regulating flow of irrigation water therethrough, and being simple in construction and readily portable so that it is well adapted for use in controlling flow from a branch ditch to a furrow between crop rows.

Ordinary water gate structures are not simple in construction. Many specialized manufacturing operations are required for their production. Furthermore, as ordinarily constructed, they are too cumbersome for use for any but relatively heavy flows of water, such as occur in main ditches. Their structural characteristics do not fit them for effectively handling the relatively small quantities of water which are finally used in the shallow laterals between crop rows of field or garden.

The present spile is extremely simple, comprising primarily a unitary, elongate body which is preferably of molded concrete, the same having a longitudinal flow passage formed from end-to-end thereof and wholly within its outer perimeter, thereby providing a conduit structure for placement leading from a branch ditch into a shallow water course between growing plants to be irrigated. The conduit structure is slotted transversely from one side thereof and across the flow passage, to accommodate a sliding gate adapted to be manually raised or lowered and frictionally held in position controlling flow of water through the spile.

The exterior side wall surfaces of the elongate body or conduit structure are advantageously made rough and pitted to facilitate packing of earth about the spile in a water-tight manner.

In the accompanying drawing, which illustrates a preferred embodiment of the spile of the invention:

Fig. 1 represents a fragmentary plan of a branch ditch and a plurality of laterals between crop rows, spiles of the invention being installed between the branch ditches and the respective laterals for conducting shallow streams of water between the rows of vegetation;

Fig. 2, a section taken on the line 2—2 of Fig. 1;

Fig. 3, a top plan of one of the spiles of the foregoing views, the same being shown partially in horizontal section as taken on the line 3—3 of Fig. 4, the gate being omitted;

Fig. 4, a fragmentary side elevation, shown partially in longitudinal, vertical section as taken on the line 4—4 of Fig. 3;

Fig. 5, an end elevation showing the sliding gate almost entirely open; and

Fig. 6, a vertical section taken on the line 6—6 of Fig. 3, but drawn to an enlarged scale.

Referring to the drawing: as illustrated in Fig. 1, a plurality of spiles 10 of the invention lead from a branch ditch 11 of an agricultural irrigation system to respective furrows or laterals 12 between crop rows 13 of a field or garden, the individual spiles being spaced in accordance with the spacing of the furrows, and passing through the bottom of the ditch bank 14 which lies between the branch ditch 11 and the field or garden.

Each spile 10 comprises an elongate cast or molded body, which is preferably square in cross-section, as illustrated, see Fig. 5, though other desirably rectangular or polygonal forms for the outer perimeter of such cross section may be adopted. A flow pasage 15 extends longitudinally from end to end of the elongate body, advantageously at the center thereof and wholly within the cross-sectional outer perimeter, thereby forming a conduit structure which may be largely buried under a ditch bank, as illustrated in Fig. 1, to provide a channel therethrough.

The flow passage 15 is preferably circular, oval, elliptical, or of other closed-curve configuration in cross-section for the sake of ease in molding and strength of the resulting product. Thus, the cross-section of preferred forms of the spile may be said to have a polygonal outer perimeter and a closed-curve inner perimeter.

For the purpose of accommodating a gate serving to control flow of water through the flow passage, the elongate body or conduit structure is slotted transversely from one side thereof and intermediate the opposite margins of that side, where the cross-sectional outer perimeter permits, so as to cross the flow passage and, in effect, define guide grooves surrounding such flow passage.

In the embodiment illustrated, a rectangular slot 16 has its opening or mouth 17 defined intermediate the opposite margins of the upper side of the elongate body or conduit structure adjacent one end thereof, here shown as that end which protrudes into the branch ditch 11, Fig. 2, and extends downwardly into the interior of such body in substantially pocket fashion so as to cross the flow passage 15 and define guide or slideway grooves surrounding the same.

The walls of the elongate spile body or conduit structure advantageously have a thickness approximating or even greater than the diameter of the flow passage, as illustrated, thereby providing sufficient depth for the guide grooves surrounding the flow passage to afford effective sealing and frictional holding action with respect to the sliding gate, and, at the same time, to provide adequate structural strength for the spile as a whole.

The gate may be any strip of rigid material capable of withstanding the action of water. Material found suitable for the purpose is ordinary wood treated with a water-proofing agent, such as linseed oil or creosote. A strip of untreated composite wood, such as "Masonite," may also be employed to advantage, or even a strip of metal or plastic. The thickness of the strip and the thickness of the slot should be correlated, so that a relatively tight sliding fit is had. In practice it will be found that such a fit, permitting quick and easy opening, closing, or intermediate adjustment of the gate, and frictional maintenance of the gate in any intermediate position, can be readily obtained.

The illustrated gate 18 is rectangular in formation, and of length to project, when in fully closed position, sufficiently far beyond the mouth of the slot 16 to provide for effective grasping in manual raising or lowering thereof. It can be readily seen that such a gate is exceedingly simple and economical to produce, install, and replace if necessary, and yet is adequate for all practical purposes. The slideway therefor, represented by the slot 16, is molded during the stage of molding the spile body proper, and no assembly operation, other than pushing the gate into place within the slot, is necessary. It is preferred that the exterior side walls of the elongate body or conduit structure be rough and pitted, so that the surrounding earth may be packed into the crevices and effectively seal the spile in place against leakage of water therearound.

Full advantage of the useful characteristics of the present spile construction is had by casting or molding the elongate spile body from a coarse aggregate concrete. Not only is the desired configuration including the longitudinal flow passage and the gate slideway, achieved to best advantage by molding, but with a coarse aggregate concrete as the plastic material, the desired rough and pitted exterior surfaces are produced coincidentally.

From the above, it will be seen that the invention provides a unitary irrigation spile, which is gated for flow regulation, and which is molded to final form in entirety, except for the sliding gate proper. The slideway for the gate is effectively provided by molding, due to the heavy walls of the elongate body or conduit structure. The spile as a whole is readily portable, and may be buried under a ditch bank and left in place as long as desired. Apart from the advantageous gating arrangement, the rough exterior walls provide for most effective installation in any earthwork.

Whereas this invention is here illustrated and described with respect to a particular preferred embodiment thereof, it should be understood that various changes apart from the mere substitutions of equivalents may be made therein and various other constructions may be adopted on the basis of the teachings hereof, by those skilled in the art, without departing from the protective scope of those of the following claims which are generic to the broader inventive concepts disclosed.

I claim:

1. An irrigation spile, comprising an elongate, molded, conduit structure of concrete, said structure being polygonal in cross-section and having a longitudinal flow passage extending from end to end therethrough, wholly within the cross-sectional outer perimeter thereof, said flow passage having closed curve formation in cross-section, the walls of said structure having substantially uniform thickness throughout, approximating the mean diameter of said flow passage; and a transverse slot of pocket formation adjacent one end of said structure, said slot extending across and completely comprehending said flow passage, and opening into one side of said structure to provide a slideway for receiving and frictionally securing a gate.

2. An irrigation spile as recited in claim 1, wherein the cross-sectional outer perimeter of the conduit structure is rectangular, the cross-section of the flow passage is substantially circular, and the slot opens into one of the sides of said structure intermediate the opposite side margins thereof.

3. An irrigation spile as recited in claim 1, wherein the outer side wall surfaces of the conduit structure are rough and pitted.

4. The combination recited in claim 1, wherein there is included in the combination a gate member formed of a single piece of rigid sheet material, said gate member being slidably disposed in said slot in a close, friction fit.

References Cited in the file of this patent

UNITED STATES PATENTS

| Number | Name | Date |
|---|---|---|
| 1,167,851 | Spiekerman | Jan. 11, 1916 |
| 1,194,951 | Burtis | Aug. 15, 1916 |
| 1,551,883 | Humphery | Sept. 1, 1925 |
| 2,456,400 | Grannopulos | Dec. 14, 1948 |